A. KIRSCH.
HAY RACK.
APPLICATION FILED SEPT. 13, 1910.
986,468.
Patented Mar. 14, 1911.
3 SHEETS—SHEET 3.
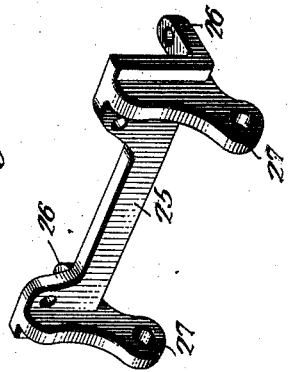
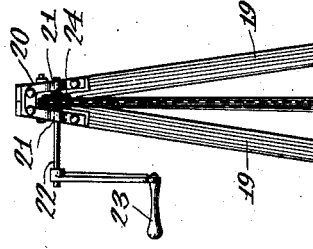
Witnesses:
Inventor:
Andy Kirsch.
By his Attorney.

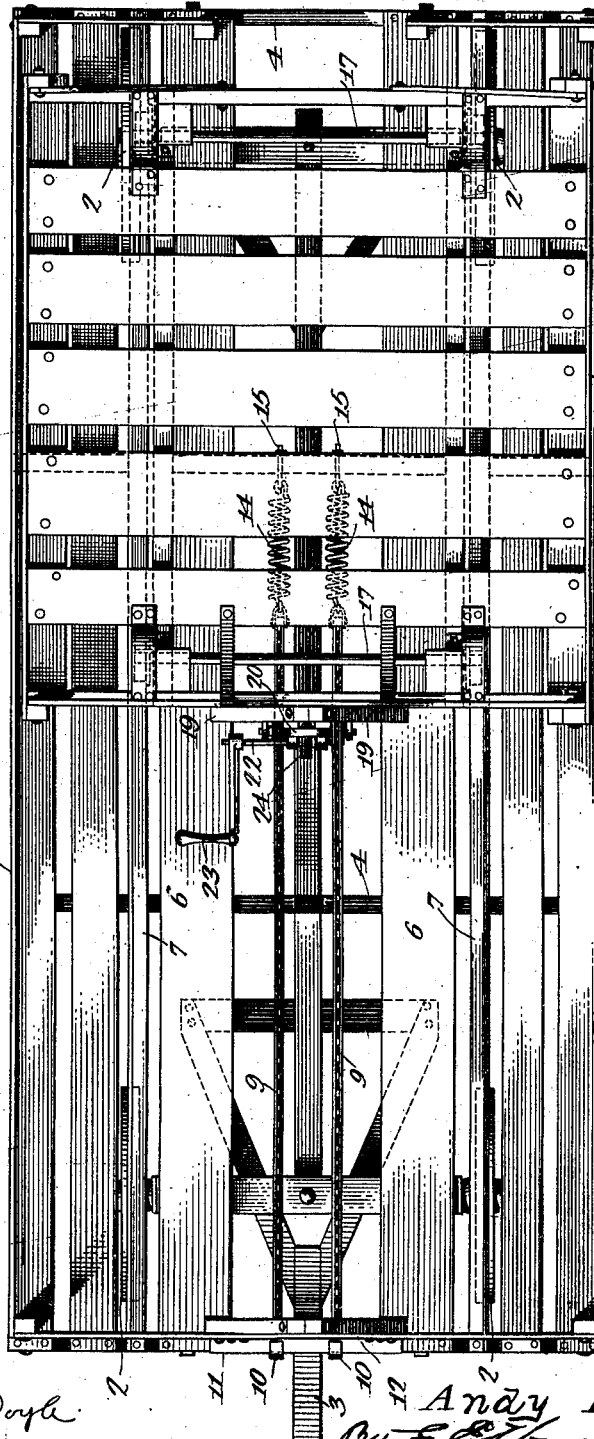

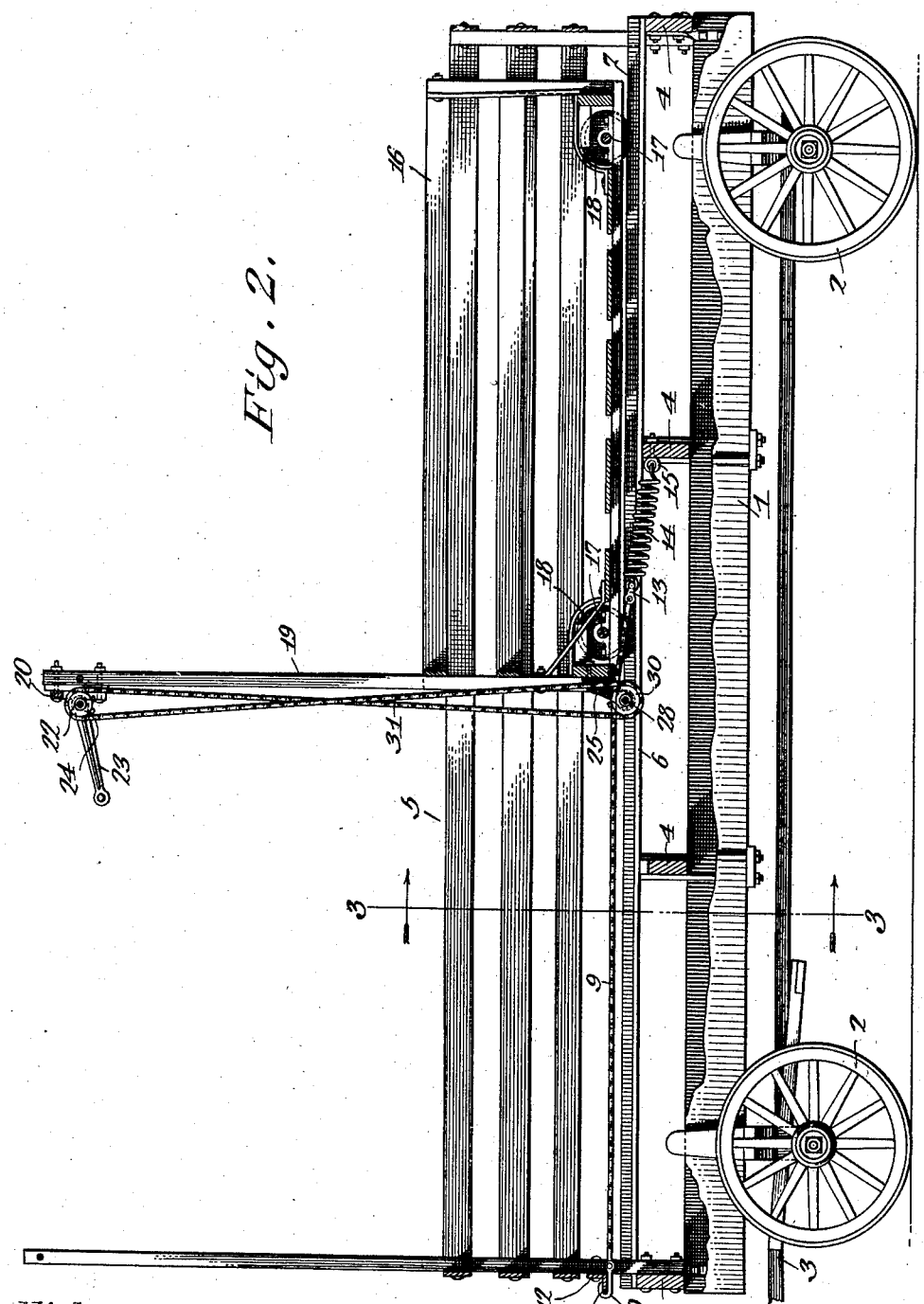

UNITED STATES PATENT OFFICE.

ANDY KIRSCH, OF CARROLL, IOWA.

HAY-RACK.

986,468.   Specification of Letters Patent.   Patented Mar. 14, 1911.

Application filed September 13, 1910. Serial No. 581,775.

*To all whom it may concern:*

Be it known that I, ANDY KIRSCH, a citizen of the United States, residing at Carroll, in the county of Carroll and State of Iowa, have invented certain new and useful Improvements in Hay-Racks, of which the following is a specification, reference being had therein to the accompanying drawing.

This invention relates to portable hay racks, and the principal object of the same is to provide novel means therefor which expedite the loading of the rack and decrease the manual labor incidental to the loading.

The invention contemplates the employment of a vehicle in the form of a hay rack the floor of which is equipped with longitudinal tracks and chains, and a car or carrier that is mounted on said tracks and provided with means for engaging said chains to propel the car from one end of the rack to the other end, so that said car can be loaded while at one portion of the rack and then moved to the other portion of the rack to permit the first mentioned portion of the rack to be loaded.

A preferred and practical embodiment of the invention is shown in the accompanying drawings, wherein:—

Figure 1 is a top plan view of the improved rack. Fig. 2 is a side view, partly in longitudinal vertical section. Fig. 3 is a transverse vertical sectional view taken on the line 3—3, Fig. 2. Fig. 4 is a detail perspective view of a hanger bearing carried by the lower portion of the car or carrier. Fig. 5 is a similar view of a bearing for the upper portion of the car or carrier. Fig. 6 is a detail fragmentary perspective view of one of the chains with which the propelling means of the car or carrier engage.

Referring to the accompanying drawings by numerals, it will be seen that the improved hay rack comprises a body 1 that is provided with the supporting wheels 2 and the usual front gear 3 to which the draft animals are attached. Said body is provided with the front, rear, and intermediate beams 4 which support the rack 5. Said rack includes the usual longitudinal floor boards 6 which are arranged in spaced parallel relation, and the tracks or rails 7 which extend parallel with said boards 6 and are preferably covered with wear-resisting material 8.

At the center of the base of the rack 5 parallel chains 9 extend longitudinally of the rack, said chains being preferably of the sprocket type and having hooks 10 at their forward ends which engage the base flange 11 of an angle beam 12 arranged transversely of the forward vertical end of the rack 5. The rear ends of said chains have shackle connections 13 with springs 14 which extend from eyebolts 15 carried by one of the intermediate supporting beams 4 of the body 1. Said springs exert a constant strain on the chains 9 tending to keep the same tight.

A car or carrier 16 is provided with transversely arranged end shafts 17 which carry rollers 18 that are mounted on the tracks or rails 7. The forward end of the car 16 is equipped with two upright standards 19 the upper ends of which converge and carry the substantially inverted U-shaped strap 20. The legs of said straps are provided with outstanding laterally projecting bearings 21 which support the horizontal shaft 22. One end of said shaft is provided with a handle 23, and between said bearings 21, said shaft 22 carries a sprocket 24. The lower bar of the upright front end of the car 16 has a plate 25 fastened thereto which is provided with rearwardly projecting lateral ears 26 that overlap and are suitably fastened to the bottom edge of said lower bar. The front surface of said plate is provided with a pair of spaced depending bearing ears 27 in which a horizontal shaft 28 is mounted, said shaft being extended beneath chains 9 and carrying sprockets 29 that engage said chains. Said shaft is also provided with a sprocket 30 which has a chain connection 31 with upper sprocket 24.

In use, the car is brought to the rear end of the rack, as shown in Figs. 1 and 2 and the car loaded, after which the same is propelled to the forward end of the rack by operating the handle 23 so that the sprocket chain connection between shafts 22 and 28 will rotate the latter shaft and cause sprockets 29 to act upon chains 9 and thereby propel the car to the opposite end of the rack. After the car has been loaded and moved away, the rear end of the rack is loaded.

With this invention it will be seen that the loading of the rack is facilitated for the reason that there is no necessity for manually transporting the material from one end of the rack to the other end.

What I claim as my invention is:—

A device of the character described comprising a rack, chains arranged longitudinally thereof, a car movable on said rack, bearings carried by one end of said car, a shaft in said bearings, sprockets carried by said shaft and engaging said chains, an intermediate sprocket on said shaft, standards carried by said car, bearings carried by the upper ends of said standards, a shaft thereon, a handle for rotating the same, a sprocket on the shaft of said standards, and a chain connection between said last mentioned sprocket and the intermediate sprocket of the lower shaft.

In testimony whereof I hereunto affix my signature in presence of two witnesses.

ANDY KIRSCH.

Witnesses:
PETER HOFFMANN,
GEO. J. SCHMITT.